Nov. 15, 1966  C. L. ELDREDGE ETAL  3,285,245
ABSORBENT WOUND DRESSING
Filed July 6, 1964
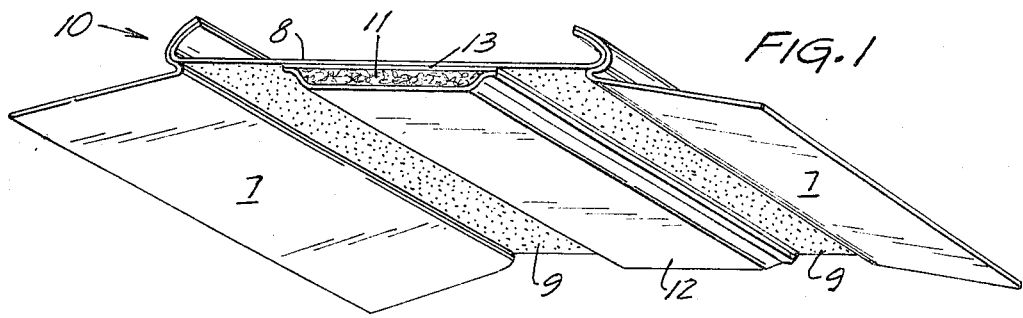
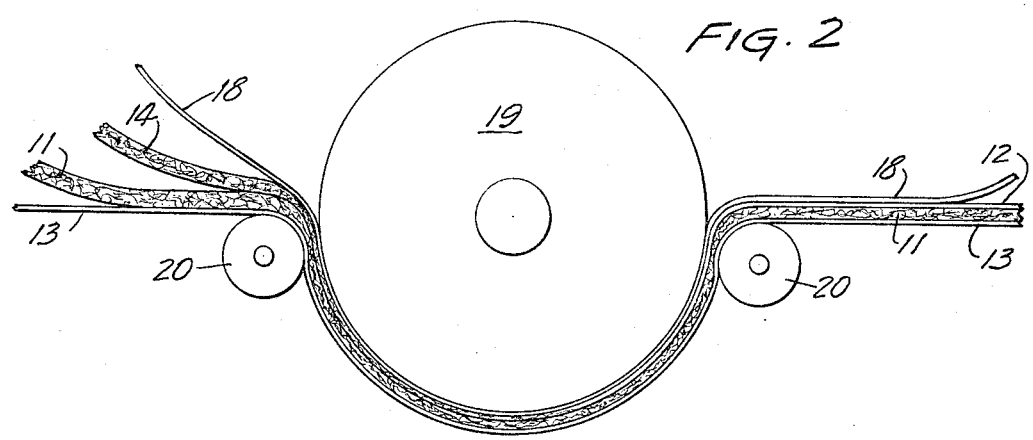
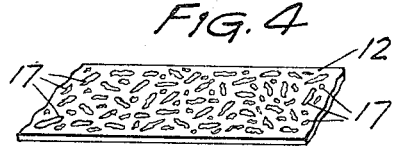
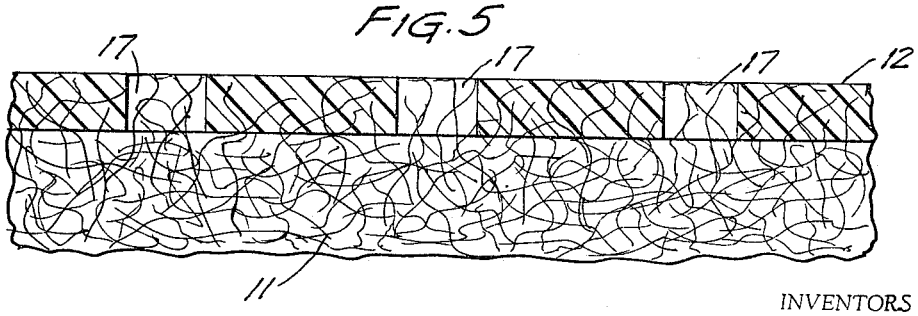
INVENTORS
CHARLES L. ELDREDGE
KARL J. PETTERS
BY
Carpenter, Abbott, Coulter & Kinney
ATTORNEYS

United States Patent Office 3,285,245
Patented Nov. 15, 1966

3,285,245
ABSORBENT WOUND DRESSING
Charles L. Eldredge, St. Paul, and Karl J. Petters, White Bear Lake, Minn., assignors to Minnesota Mining and Manufacturing Company, St. Paul, Minn., a corporation of Delaware
Filed July 6, 1964, Ser. No. 380,580
9 Claims. (Cl. 128—156)

This invention relates to absorbent surgical dressings and the like and particularly to dressings whose normal function is the protection of wounds and the absorption of fluids exuding therefrom.

Surgical dressings of this type are required to be highly absorbent to absorb exudate as it exudes from a wound. However, all known suitable absorbent materials when laid in contact with a wound surface become bonded to the eschar of the wound. Removal of the dressing from the wound necessitates separation of the absorbent material from the eschar. Due to sticking of the dressing to the wound, removal is often painful and frequently reopens the wound by pulling all or part of the eschar therefrom, thus causing regression of the healing process.

Several dressings have been proposed in an attempt to reduce or obviate bonding of the dressing to the eschar while retaining the required absorbent qualities. One such dressing is that taught by W. B. Dockstader et al. in his U.S. Patent 2,923,298 wherein the dressing is provided with a mechanically perforated, nonporous, lubricious outer layer or facing of a continuous organic polymer film, e.g. "Mylar." The facing is nonabsorbing and the perforations provide the necessary communication between the absorbing material and the wound. But, the area of contact between the wound and the absorbent material is drastically reduced. Further, there is still direct contact between the absorbent material and the wound surface which is made at the openings in the facing created by the perforations and bonding still frequently results between the absorbent material and the eschar.

The absorbent dressing of this invention is one which combines an absorbent backing and a non-adherent facing, or wound release layer, to provide a dressing having excellent wound release properties which nevertheless is highly absorbent throughout the surface area of the facing. This new dressing maintains the almost total absorbency of the backing, e.g. cotton wadding, cellulosic wadding, cellulose acetate, etc., while still providing an inert, non-absorbent release layer, or facing, for contacting the wound. Unlike prior attempts to make such a combination efficient, which centered around the provision of inert facing layers having mechanical punctures or slits therethrough requiring wound exudate to first find a path through the facing layer to the absorbent backing, this new dressing provides an inert release layer or facing for contacting the wound which is porous substantially throughout its exposed surface area. Thus, exudate passes immediately through the facing layer as it is formed without being required to flow to specifically defined openings.

In accordance with this invention, an absorbent dressing is provided that combines an absorbent backing material with a breathable nonadhering inert release layer or film, the outer surface of the film being naturally porous substantially throughout its area yet non-adherent to the wound exudate. The invention and its advantages are further described in the following detailed description and drawings in which FIGURE 1 illustrates in perspective an absorbent pad for surgical dressing of the present invention, FIGURE 2 illustrates schematically a process suitable for construction of the pad illustrated in FIGURE 1, FIGURE 3 is a greatly enlarged view in perspective of the starting material which forms the facing layer of the surgical pad upon conversion by the process of FIGURE 2, FIGURE 4 is a view similar to FIGURE 3 of the facing layer of the pad; and, FIGURE 5 is a much enlarged cross-sectional view of the facing and absorbent layers of the pad illustrating the manner in which these layers are united with one another.

Referring to FIGURE 1 which illustrates the preferred embodiment of the present invention, a tape supported dressing 10 comprises a pad consisting of a highly absorbent layer 11 sandwiched between a release layer or facing 12 and a backing sheet 13. The purpose of the backing sheet is to contain the absorbent "fluff" material within the dressing pad to facilitate handling thereof. This backing sheet may be any lightweight web, as for example gauze, but is preferably viscose. A layer of tape 8, e.g. microporous surgical tape such as that of Patent No. 3,121,021 issued to Frank Copeland on February 11, 1964, may be adhered to the backing sheet and has flaps extending beyond the edges of the pad for holding the dressing in place over the wound area; the exposed adhesive surface 9 of the tape is normally protected by a strippable liner 7, which also serves to cover the facing 12 prior to use of the pad 10, this liner being illustrated in FIGURE 1 in the process of being stripped from the adhesive.

The absorbent layer 11 can comprise any of the accepted absorbent materials, e.g. cotton, rayon, cellulosic batts, etc. for use in surgical dressings. However, preferred absorbent materials are fibrous batts, wadding or the like, of thermoplastic fibers which can be readily united with the release layer 12 by simple heat sealing techniques, and which may soften and conform to a surface upon the application of heat sufficient to melt the facing layer fibers. A presently preferred material for the absorbent layer of the dressing is cellulose acetate, in the form of fibers having a denier in the range of .6 to 3.0 and having a web weight in the range of 30 to 100 pounds per 320 square yards.

The construction of the release layer 12 is important for the proper functioning of the present dressing. Inert, non-absorbent to animal body exudates, thermoplastic, organic polymers, such as polypropylene, nylon and polyethylene have been found suitable, although it will be understood that other nonabsorbent slippery feeling, hydrophobic thermoplastic polymers might also be used. In particular, the release layer of the preferred embodiment of the present invention is provided as a soft, flexible, thin, nonabsorbent to wound exudate, naturally highly porous, self-sustaining, discontinuous film of fused and coalesced nonwoven, inert, thermoplastic, synthetic polypropylene fibers of no greater than about 4 denier, the release layer having a weight of about 5 to 20 pounds per 320 square yards, and having an outer smooth-feeling, skin-like appearing surface.

Upon microscopic examination, the film is observed to contain an average of about 10 to 40 pores or holes 17 (FIG. 4) per square millimeter of surface, the holes being roughly rectangular or oblong and ranging in length from about 15 to about 220 microns and larger and in width up to about 75 microns. The average hole size is no larger, and usually much smaller, than 0.01 sq. mm. being on the order of about 0.005 sq. mm. and smaller. Overall, about 15–35%, preferably 20–30%, of the surface area of the film is comprised of said openings.

Apparently the large number of tiny holes enables exudate to quickly pass through the release layer for absorption while the small average area of the holes and their thin, irregular, sliver-like shape, discourage retention of any ties between newly formed exudate on the wound side of the release layer and exudate which has already passed into the release layer. The irregular shape of the holes is illustrated at 17, insofar as illustration is practical, in FIGURE 4.

This release layer can be constructed by forming a non-woven matting 14 of the polypropylene fibers and subjecting the matting to a low heat treatment, e.g. approximately 300° F. which softens the fibers and causes them to adhere to one another to make the matting self-sustaining and thereby facilitate handling thereof. The matting is then placed on a polyester carrier web 18 which carries the matting thereon around a heated drum 19, the polyester carrier being between the matting and the drum. The drum is heated to approximately 395° F. and pressure rollers 20 firmly press the matting against the drum to insure uniform heat transfer to the complete surface of the matting. By properly controlling the rate of travel of the carrier web, with the temperature of the drum 19 and pressure of the nip rolls 20, the fibers nearest the surface of the drum are melted and coalesce to form a discontinuous naturally porous film. The film surface abutting the smooth polyester carrier web presents a smooth feeling slick surface having a human skin-like appearance with a myriad of tiny pores or holes therethrough.

As will be noted by reference to FIGURE 2, the entire pad is constructed during this heat treatment of the polypropylene fibers. The three layers of pad materials, i.e. a top layer of non-absorbent polypropylene fibers 14, shown in FIGURE 3, a second layer of absorbent cellulose acetate fibers 11, and a bottom layer comprising a web of viscose 13 are stacked one upon the other. Then the polyester carrier web 18 or the like (e.g. silicone coated cloth or silicone liners) is placed over the polypropylene fibers and the four layer sandwich is fed into the nip between one of the two pressure rolls 20 flanking the heated bonding drum 19 with the carrier web 18 immediately adjacent to the drum.

Each pressure roll 20 has a diameter of eight inches and the bonding drum 20 has a diameter of 24 inches. Each pressure roll is a rubber surfaced cylinder approximately 43 inches long and the width of contact area between the pressure roll and the drum is ¾ inch. It has been found that superior product results from a nip pressure of between 20 and 55 p.s.i.; a nip pressure of approximately 29.5 pounds per square inch has been found quite satisfactory.

The temperature of the bonding drum is preferably maintained within the range of 350° F. to 420° F. for proper melting of the polypropylene fibers. The speed of the carrier web should vary in accordance with the temperature of the bonding drum, running slower at the cooler temperature and faster at the hotter temperatures. At the preferred temperature of 395° F. the web speed should be approximately 5 to 7 yards per minute.

The four layer sandwich is passed half way around the drum and through the second nip formed between the drum 19 and the second nip roller 20. The sandwich is then led away from the drum and allowed to cool. When the temperature adjacent the carrier web drops below 300° F. the carrier web may be stripped from the dressing without damaging the smooth porous surface of the release layer.

With this procedure, the facing or release layer 12 is united with the absorbent backing substantially throughout their contacting areas while the layers are in contact with one another. Fibers of the absorbent backing 11 are embedded within the facing 12 and form a integral part of the structure of the release layer.

As illustrated by FIGURE 5 absorbent fibers are embedded throughout the facing and those near and at the polyester web contacting surface of the release layer and which bridge, or pass into the pores thereof are softened and flattened by the heat and pressure as the assembly moves over the drum. This contributes to the overall smoothness of the surface of the release layer. When applied to a fresh wound the dressing exhibits a soft blotting paper type absorbency wherein exudate quickly spreads horizontally as well as vertically into the absorbent layer as it passes into the pores 17 of the release layer. A drop of water placed on the facing layer is immediately absorbed and spreads horizontally as well as vertically into the absorbent layer without particular concentration. This rapidity of absorption and horizontal spreading is unique. The absorbency is believed enhanced when the absorbent layer is of thermoplastic fibers such as cellulose acetate; these fibers not only embed within the release layer, but because they also soften and flatten as they contact or lie adjacent to the polyester carrier web, they contribute to the smooth, slick feel of the release layer while actually enhancing the absorbency of the dressing, quickly wicking exudate away from the wound through the release layer.

While a preferred embodiment has been described, the invention is susceptible of considerable variation. Thus, both surfaces of the absorbent layer, may have release layers provided thereon and the resultant sheet wound into rolls, cut into pads, or otherwise provided for packaging or distribution. The absorbent layer may be backed with a continuous, impermeable film to provide an occlusive dressing, bed pad, or similar product. With respect to the release layer, it may be formed of blends of thermoplastic fibers, and/or formed separately from the absorbent layer and thereafter heat-united with the absorbent layer.

Since other variations within the ambit of this invention will occur to those skilled in the art, what is claimed is:

1. An absorbent wound dressing capable of absorbing wound exudate without sticking to the wound comprising an absorbent backing for absorbing wound exudate and a thin, highly porous, thermoplastic facing adapted to releasably contact a wound surface, said thermoplastic facing being non-absorbent to wound exudate and comprising a discontinuous self-sustaining film having about 10 to 40 pores per square millimeter of film surface, said pores having an average area of no more than about 0.01 square millimeter and constituting about 10% to about 40% of the total area of said facing.

2. A wound dressing for absorbing wound exudate without sticking to the wound while maintaining the wound area moist, said dressing comprising a wound exudate absorbing fibrous backing and a thin self-sustaining, highly porous, thermoplastic film facing nonabsorbent to wound exudate, the porosity of said facing being provided by numerous, randomly spaced, tiny holes through said facing, said holes constituting from about 10% to about 40% of the total area of said facing, and having an average area of no greater than about 0.01 square millimeter per hole.

3. A wound dressing for absorbing wound exudate without sticking to the wound while maintaining the wound area moist, said dressing comprising an absorbent fibrous backing and a thin self-sustaining, highly porous, non-absorbent thermoplastic film facing, the porosity of said facing being provided by numerous, randomly spaced, tiny holes through said facing, said fibrous backing having fibers thereof embedded in said facing substantially throughout the area of contact of said backing and said facing uniting said backing and facing to one another.

4. An absorbent wound dressing as defined in claim 3 including a tape layer affixed to the backing opposite the thermoplastic facing for adhesively applying the dressing over the wound area.

5. A wound dressing for absorbing wound exudate without sticking to the wound while maintaining the wound area moist, said dressing comprising an absorbent fibrous backing and a thin self-sustaining, highly porous, nonabsorbent thermoplastic film facing, the porosity of said facing being provided by numerous, randomly spaced, tiny holes through said facing, said fibrous backing having fibers thereof embedded in said facing and uniting said backing and facing to one another substantially throughout the area of contact thereof, said holes constituting from about 10% to about 40% of the total area of said facing and having an average area of no greater than about 0.01 square millimeter per hole.

6. An absorbent wound dressing capable of absorbing wound exudate without sticking to the wound comprising an absorbent backing for absorbing wound exudate and a thin, highly and naturally porous thermoplastic facing, inert to wound exudate, and through which wound exudate may readily pass, said facing comprising a thin self-sustaining, film of inert, hydrophobic, and nonabsorbent thermoplastic fibers fused and coalesced with one another to form a discontinuous film facing said backing and containing numerous, irregularly shaped tiny openings for facilitating the passage of exudate therethrough from a wound to said absorbent backing.

7. An absorbent wound dressing capable of absorbing wound exudate without sticking to the wound comprising a fibrous, absorbent backing for absorbing wound exudate and a thin, highly and naturally porous thermoplastic facing, inert to wound exudate, and through which wound exudate may readily pass, said facing comprising a thin self-sustaining film of inert, hydrophobic, and nonabsorbent thermoplastic fibers fused and coalesced with one another to form a discontinuous film facing said backing and containing numerous, irregularly shaped tiny openings for facilitating the passage of exudate therethrough, from a wound to said absorbent backing, fibers of said backing being embedded within said facing throughout their contacting areas, said embedded fibers uniting said backing and facing to one another.

8. An absorbent wound dressing capable of absorbing wound exudate without sticking to the wound comprising an absorbent backing for absorbing wound exudate and a thin, highly and naturally porous thermoplastic facing inert to wound exudate and through which wound exudate may readily pass, said facing comprising a thin self-sustaining film of inert and nonabsorbent thermoplastic fibers fused and coalesced with one another and with said backing to form a discontinuous film having numerous, irregularly shaped tiny openings therethrough for facilitating the passage of exudate therethrough from the wound to the absorbent backing, said absorbent backing being fibrous and having fibers thereof embedded in said facing substantially throughout the area of contact of said backing and said facing with one another to wick exudate quickly horizontally as well as deeply into said backing.

9. An absorbent wound dressing capable of absorbing wound exudate without sticking to the wound comprising a porous, nonabsorbent, release layer and a thermoplastic, absorbent, fibrous, backing layer, said release layer consisting essentially of a thin, nonabsorbent, self-sustaining, discontinuous, naturally highly porous film of fused and coalesced, inert, synthetic, thermoplastic fibers, said film having a slick, skin-like surface that is naturally porous, smooth feeling and hydrophobic, fibers of said absorbent backing layer extending into said release layer throughout the area of contact of said layers with one another and joining said layers to one another, there being about 10 to 40 pores per square millimeter of surface of said release layer, said pores having an average size smaller than about 0.005 square millimeters and constituting from about 10% to about 40% of the surface area of said release layer.

References Cited by the Examiner
UNITED STATES PATENTS 2,923,298  2/1960  Dockstader et al. _____ 128—296
3,006,338  10/1961  Davies _____ 128—156

ADELE M. EAGER, *Primary Examiner.*